No. 718,743. PATENTED JAN. 20, 1903.
C. W. VAN DEURSEN.
CHURN.
APPLICATION FILED SEPT. 14, 1901.
NO MODEL.

Witnesses:
C. D. Kesler
Robert Everitt

Inventor
Cornelis Wilhelmus van Deursen
By James L. Norris
Atty.

THE NORRIS PETERS CO., PHOTO-LITHO., WASHINGTON, D. C.

UNITED STATES PATENT OFFICE.

CORNELIS WILHELMUS VAN DEURSEN, OF DREUMEL, NETHERLANDS.

CHURN.

SPECIFICATION forming part of Letters Patent No. 718,743, dated January 20, 1903.

Application filed September 14, 1901. Serial No. 75,404. (No model.)

*To all whom it may concern:*

Be it known that I, CORNELIS WILHELMUS VAN DEURSEN, gentleman, a subject of the Queen of the Netherlands, residing at Dreumel, in the Province of Gelderland, Kingdom of the Netherlands, have invented certain new and useful Improvements in Churns, of which the following is a specification.

This invention relates to improvements in churns.

As is known, butter is made from cream in churns, the separation of the butter-fat being effected by heating or stirring. This means of working is, however, very tedious and requires a great expenditure of power.

In my improved churn air or gas is introduced under pressure from beneath into the cream. By the rising of the bubbles of air through the cream the separation of the particles of butter-fat is accelerated.

Figure 1:
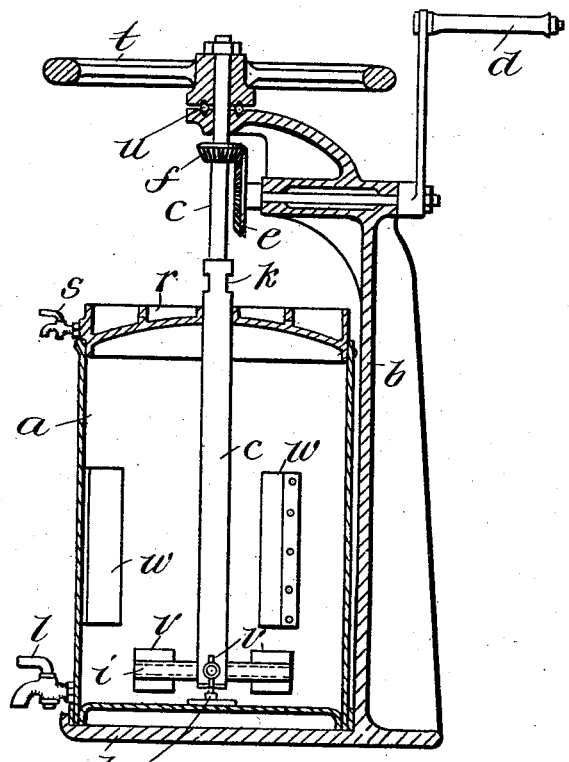
Figure 2:
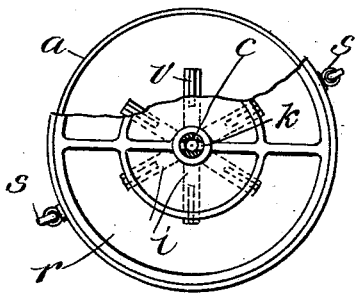

In the accompanying drawings, Figure 1 is a central vertical section of the churn, and Fig. 2 is a top plan view of the churn, the cover thereof partly broken away and the shaft in section.

The vessel $a$, filled to about half of its height with cream, stands in the frame $b$. In the axis of the vessel $a$ moves a hollow shaft $c$, which runs at the top in a ball-bearing $u$ and is guided at the bottom by a center $h$. The shaft $c$ is rotated by means of a crank-handle $d$ and friction or gear wheels $e$ and $f$, the uniformity of the motion being increased by a fly-wheel $t$. At the lower end of the shaft are, for example, five or more tubes $i$, which are arranged radially and open into the hollow shaft $c$, Fig. 2. By the centrifugal force set up in the rotation the cream in the shaft $c$ and tubes $i$ is first driven out and then the air, which flows into this hollow shaft and the tubes $i$ through the apertures $k$ at the upper part of the said shaft. This air is thus forced to rise through the cream. There is always alternately an outward flow of cream and air and a return flow of the cream at the openings of the tubes $i$. The air consequently enters the cream in the form of air-bubbles. This continuous flow of air-bubbles through the cream causes the separation of the butter, which takes place completely after a short time. The particles of fat rise, and after complete removal of the fat the milk can be run off by means of the cock $l$.

The vessel $a$ can be closed by a cover $r$ made in two parts. This cover $r$ is so arranged that it can be filled in the summer with ice to cool the cream or in the winter with hot water to warm the cream. In order to remove this water easily, the cover is arched or curved and provided with outlet-cocks $s$.

The tubes $i$ are provided on their upper and lower sides with small imperforate vanes $v$, while three or more beater-bars $w$ are secured against the inner wall of the vessel $a$. The vanes $v$ assist the action of the centrifugal force, and consequently the speed at which the shaft is turned can be made considerably lower.

Having now particularly described and ascertained the nature of my said invention and in what manner the same is to be performed, I declare that what I claim is—

An apparatus for making butter or cheese comprising a vessel, a rotatable hollow shaft extending therein, a plurality of radially-extending hollow tubes having open ends, said tubes connected and communicating with said shaft, and a vertically-extending imperforate vane connected to the outer end of said tubes, said vanes projecting above and below the said tubes.

In testimony whereof I have hereunto set my hand in presence of two subscribing witnesses.

CORNELIS WILHELMUS VAN DEURSEN.

Witnesses:
  THOMAS HERMANUS VERHAIE,
  AUGUST SIEGFRIED DOCEN.